United States Patent [19]

Shimomura et al.

[11] Patent Number: 5,686,508
[45] Date of Patent: Nov. 11, 1997

[54] INK AND INK JET RECORDING METHOD AND APPARATUS USING THE SAME

[75] Inventors: Masako Shimomura, Yokohama; Hiromichi Noguchi, Atsugi, both of Japan

[73] Assignee: Canon Kabushiki Kaisha, Tokyo, Japan

[21] Appl. No.: 335,395

[22] Filed: Nov. 3, 1994

[30] Foreign Application Priority Data

Nov. 12, 1993 [JP] Japan ................... 5-283474

[51] Int. Cl.⁶ ..................................... C08K 5/21
[52] U.S. Cl. ................ 523/161; 524/211; 524/212; 106/20 R; 106/20 H; 260/DIG. 38; 346/1.1
[58] Field of Search .............. 523/161; 106/20 R, 106/22 H; 260/DIG. 38; 346/1.1; 524/211, 212

[56] References Cited

U.S. PATENT DOCUMENTS

| | | | |
|---|---|---|---|
| 5,173,112 | 12/1992 | Matrick et al. | 106/20 |
| 5,184,148 | 2/1993 | Suga et al. | 346/1.1 |
| 5,250,109 | 10/1993 | Chan et al. | 106/22 H |
| 5,354,369 | 10/1994 | Shimomura et al. | 106/22 H |

FOREIGN PATENT DOCUMENTS

| | | |
|---|---|---|
| 0429828 | 6/1991 | European Pat. Off. . |
| 0569864 | 11/1993 | European Pat. Off. . |
| 49-33933 | 9/1974 | Japan . |
| 61-55552 | 11/1986 | Japan . |
| 1-28790 | 6/1989 | Japan . |
| 3210373 | 9/1991 | Japan . |
| 4-85375 | 3/1992 | Japan . |

*Primary Examiner*—Paul R. Michl
*Assistant Examiner*—John J. Guarriello
*Attorney, Agent, or Firm*—Fitzpatrick, Cella, Harper & Scinto

[57] ABSTRACT

An object of the present invention is to provide an ink, and ink jet recording method and apparatus using the ink which has excellent dispersion stability, discharge stability and recovery properties, and which can be kept in the weak alkali region even if it contains carbon black with low pH, which is generally considered to be difficult to handle and which can obtain a high-density image. The ink contains acid carbon black having a volatile content within the range 3.5 to 8% by weight, and a water-soluble resin having a weight average molecular weight within the range of 3,000 to 30,000, both of which are dissolved in an aqueous liquid medium, and a compound represented by the following formula (I), wherein the ratio by weight between the acid carbon black and the water-soluble resin is within the range of 3:1 to 10:1.

$$R_1R_2NCONHCH_2CH_2OH \quad (I)$$

wherein $R_1$ and $R_2$ each is hydrogen or $C_nH_{2n}OH$, n is 2 or 3, with the proviso that $R_1$ and $R_2$ are not simultaneously hydrogen.

21 Claims, 3 Drawing Sheets

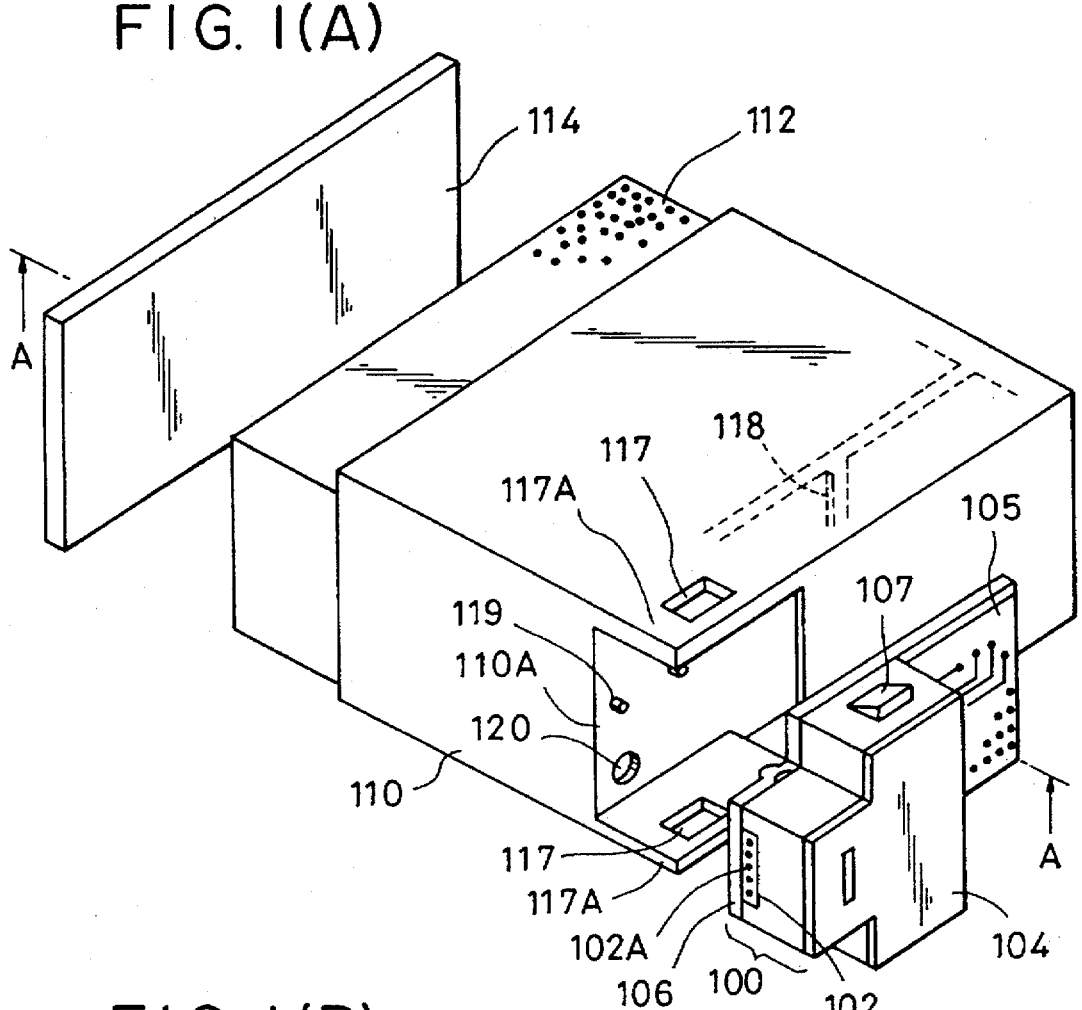
FIG. I(A)
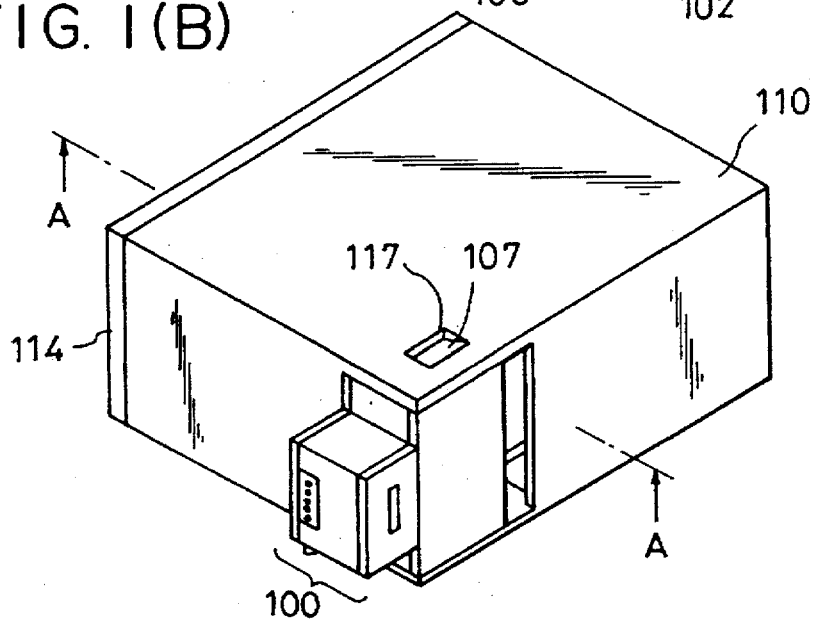
FIG. I(B)

INK AND INK JET RECORDING METHOD AND APPARATUS USING THE SAME

BACKGROUND OF THE INVENTION

1. Field of the Invention

The present invention relates to an ink, particularly to a pigment ink suitable for ink jet recording, an ink jet recording method using the ink, and an ink jet apparatus containing the ink.

2. Description of the Related Art

An ink jet recording system has the advantages that less noise occurs in recording, and that a recorded image with high resolution can be obtained at a high speed by using a highly-integrated head.

Such an ink jet recording system uses as an ink a solution obtained by dissolving a water-soluble dye in water or a mixture of water and an organic solvent. However, the use of the water-soluble dye frequently causes the recorded image to have low light resistance because of the poor light resistance of the water-soluble dye, and the low water resistance, because of the water-solubility of the ink. Namely, when the recorded image is exposed to rain, sweat or drinking water, the recorded image is sometimes blurred or disappears.

In order to improve fastness, investigations to find a water-soluble pigment ink having excellent water resistance and light resistance had been made. Particularly, acid carbon having low volatile content and pH, as disclosed in Japanese Patent Laid-Open No. 3-210373, had been investigated because the use of such carbon produces images having high density regardless of the type of the paper used.

However, since such acid carbon exhibits dispersion stability which is far worse than that of conventional basic carbon, the selecting on the type, amount and acid value of the dispersant, and the neutralizer (alkali substance) for neutralizing the dispersant used are strictly limited. In addition, even inks formed by using the selected materials face rapid increases in the viscosity of the ink and pigment agglomeration and deposition due to evaporation of only a small amount of water. In other words, in order to satisfy various properties of the ink containing acid carbon, such as the dispersion stability, discharge stability, recovery properties, pH maintenance, at least a weak alkali humectant having chemical stability must be added. In U.S. Pat. Nos. 5,173,112 and 5,250,109, an amide of polyoxyalkyamine, a sulfonamide, urea or a thiourea derivative is added to a dye or pigment ink in order to improve clogging and preservation stability. However, as described above, only a narrow range of permissible substances can be combined with acid carbon, and sufficient reliability cannot be obtained by these substances.

Japanese Patent Publication No. 61-55552 discloses various humectants for dye ink. However, in this specification, the amounts of the dispersant and humectant used in an ink containing acid carbon are not investigated.

Japanese Patent Publication No. 1-28790 and Japanese Patent Laid-Open No. 4-85375 disclose attempts to resolve the above problems by adding urea to a pigment ink. However, if urea is added to an ink containing carbon having low volatile content and pH, ammonium ions produced by decomposition of urea cause the carbon or the dispersant to chemically change, thereby promoting agglomeration of the pigment. Consequently, pre-discharge must be performed for preventing clogging of an ink discharge opening. Clogging and deterioration in the recovery operation occur not only in the discharge opening but also in the ink supply tube and recovery system (head cleaning by suction).

Although a conventional ink jet recording system often includes a head which is integrated with an ink tank containing an ink, a separate system containing a head and an ink tank which are separated from each other has recently been popularized.

In such a separate system, since water easily vaporizes from the connection portion between the head and the ink tank, causing agglomeration of the pigment, more rigorous ink characteristics are required.

Further, metallic parts in the system are usually corroded with ammonia produced by decomposition, thereby producing an odor that gives the user an unpleasant feeling.

To solve the above problems, methods other than adding urea to an ink, for example, a method of increasing the ratio of a dispersant to a pigment for preventing agglomeration, have been investigated.

Since the viscosity of the ink increases with an increase in the ratio of the dispersant to the pigment, the sedimentation rate decreases in accordance with the Stokes' equation of sedimentation rate, thereby retarding agglomeration and thus solving the problem of sediments due to the agglomeration of the pigment. However, an increase in the viscosity of the ink deteriorates the discharge property of the ink. Particularly, in an ink jet recording system of the type in that ink droplets are discharged by the action of thermal energy to record an image, there is also the problem that when the concentration of the organic substance in ink is increased, the organic substance thermally decomposed adheres to a heating part, and thus interrupts foaming of the ink.

SUMMARY OF THE INVENTION

Accordingly, an object of the present invention is to provide an ink, an ink jet recording method and apparatus using the ink which exhibits excellent dispersion stability, discharge stability and recovery properties, and which can maintain weak alkalinity even if it contains carbon black at low pH, which is generally considered to be difficult to handle, and which can obtain a uniform image with a high density regardless of the type of the paper used.

In accordance with a first embodiment of the present invention, there is provided an ink comprising acid carbon black having a volatile content of 3.5 to 8 % by weight and a water-soluble resin having a weight average molecular weight within the range of 3,000 to 30,000, both of which are dissolved in an aqueous liquid medium, and a compound represented by the following formula (I), the ratio by weight between the acid carbon black and the water-soluble resin being within the range of 3:1 to 10:1.

$$R_1R_2NCONHCH_2CH_2OH \quad (I)$$

wherein $R_1$ and $R_2$ each is hydrogen or $C_nH_{2n}OH$, n is 2 or 3, with the proviso that $R_1$ and $R_2$ are not simultaneously hydrogen.

In accordance with a second embodiment of the present invention, there is provided an ink jet recording unit comprising an ink container portion containing an ink and a head portion for discharging the ink as ink droplets, wherein the ink is an ink in accordance with the first embodiment.

In accordance with a third embodiment of the present invention, there is provided an ink cartridge comprising an ink container portion containing an ink, wherein the ink is an ink in accordance with the first embodiment.

In accordance with a fourth embodiment of the present invention, there is provided an ink jet recording apparatus comprising a recording unit having an ink container portion containing an ink and a head portion for discharging the ink as ink droplets, wherein the ink is an ink in accordance with the first embodiment.

In accordance with a fifth embodiment of the present invention, there is provided an ink jet recording apparatus comprising an ink cartridge having an ink container portion containing an ink and a recording head for discharging the ink as ink droplets, wherein the ink is an ink in accordance with the first embodiment.

In accordance with a sixth embodiment of the present invention, there is provided an ink jet recording method comprising recording by discharging an ink as ink droplets, wherein the ink is an ink in accordance with the first embodiment.

BRIEF DESCRIPTION OF THE DRAWINGS

FIGS. I(A) and i(B) are an exploded perspective view and an external perspective view, respectively, illustrating an example of a construction of an ink jet recording head in accordance with an embodiment of the present invention.

DESCRIPTION OF THE PREFERRED EMBODIMENTS

Figure 2:
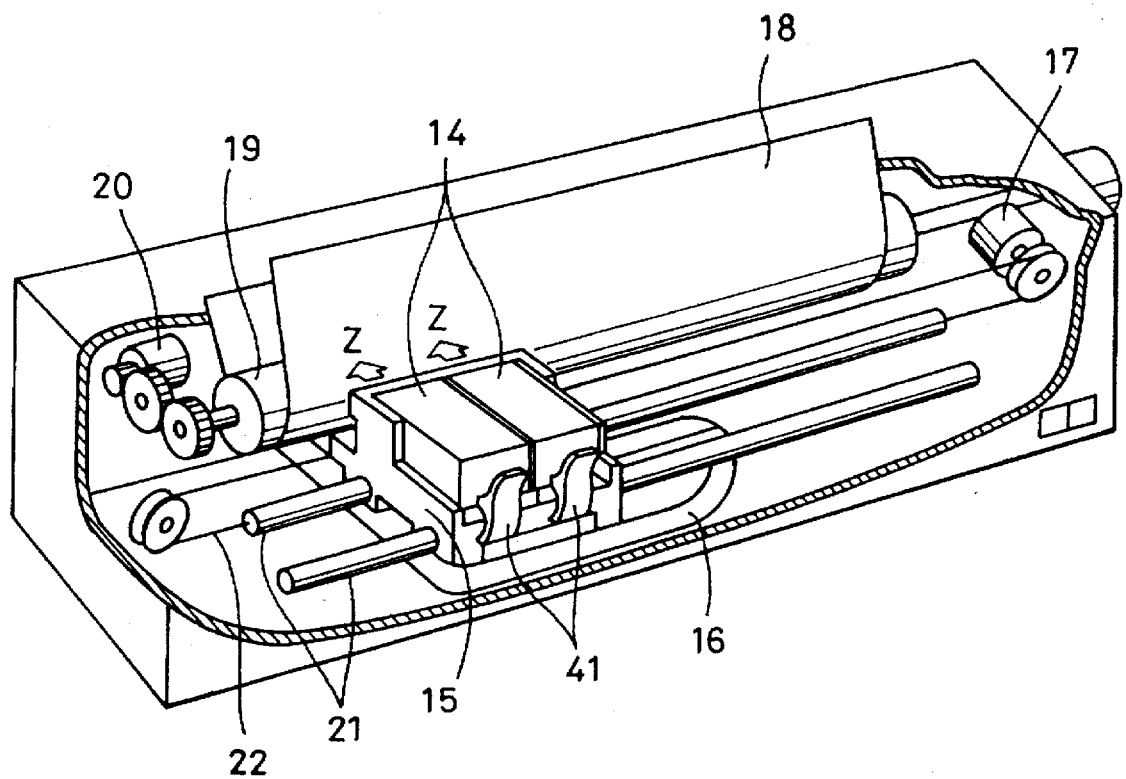
FIG. 2 is a perspective view illustrating an example of an ink jet printer comprising the recording head shown in FIG. 1.

As a result of development of an ink jet recording ink which simultaneously satisfies the above various requirements, it was found that an ink containing a specified acid carbon and a water-soluble resin at a specified ratio and an urea derivative represented by formula (I) can form a print image having excellent fastness and a high density, and is excellent in dispersion stability, discharge stability, recovery properties and pH maintenance. This led to the achievement of the present invention.

The urea derivative which is characteristic of the present invention is represented by the following formula (I):

$$R_1R_2NCONHCH_2CH_2OH \qquad (I)$$

wherein $R_1$ and $R_2$ each is hydrogen or $C_nH_{2n}OH$, n is 2 or 3, with the proviso that $R_1$ and $R_2$ are not simultaneously hydrogen.

Examples of such an urea derivative are followings:

(1) $R_1=H$, $R_2 =CH_2CH_2OH$ (2) $R_1=CH_2CH_2OH$, $R_2=CH_2CH_2OH$ (3) $R_1=H$, $R_2=CH_2CH_2CH_2OH$ (4) $R_1=CH_2CH_2CH_2OH$, $R_2=CH_2CH_2CH_2OH$

Of these derivatives, 1,3-bis (β-hydroxyethyl) urea is preferred.

The urea derivative of the present invention, which is represented by formula (I), has a structure similar to urea and contains, in its molecule, 2 or 3 hydroxyl (—OH) groups having high affinity for water. The urea derivative thus has moisture retention superior to urea, which already has excellent moisture retention, and generates alkanolamine by hydrolysis with a degree lower than the generation of ammonium ions by urea. Since the produced alkanolamine has good compatibility with water and other solvents, functions as a pH maintaining agent, and hardly vaporizes because of its high boiling point, ink non-discharge due to agglomeration and drying of the pigment used only slightly occurs. Thus, the ink of this invention has excellent recovery properties.

Although the content of the urea derivative in the ink of the present invention depends upon the amount and type of the coloring agent used, or the recording method used, the content is preferably within the range of 0.1 to 10% by weight, more preferably within the range of 1 to 10% by weight, based on the total weight of the ink. With a content less than 0.1% by weight, there is no effect of preventing fixing at the nozzle tip. With a content more than 10% by weight, discharge properties deteriorate.

The method of synthesizing the urea derivative of the present invention represented by formula (I) is described below. Viewing the structure of the urea derivative of the present invention, it appears that the derivative may be synthesized by adding ethylene oxide to urea. However, the derivative cannot be actually synthesized by this method. The reason is described below. Ethylene oxide is generally gas, but urea is a solid and must thus be melted or dissolved in a solvent to form a solution. However, since urea is thermally decomposed, it is undesirable to melt urea. In addition, since urea produces addition reaction in a proton-supplying polar solvent such as water, glycerin, or ethylene glycol used for dissolving urea, urea will react with the polar solvent upon heating prior to the addition reaction with ethylene oxide. Non-proton polar solvents such as N-methylpyrrolidone, dimethylformamide and so on do not dissolve urea. Accordingly, the method of synthesizing the derivative by adding ethylene oxide to urea is not feasible. In the present invention, 2-oxo-oxazolidine may be mixed with monoethanolamine, monopropanolamine, diethanolamine or dipropanolamine, respectively, and the thus-formed mixtures are then heated in an oil bath at 120° to 130° C. for about 20 minutes, cooled and crystallized with acetone to obtain 1,3-bis-(β-hydroxyethyl) urea, (1-γγ-hydroxypropyl-3-(β-hydroxyethyl) urea, 1,1-bis-(β-hydroxyethyl)-3-(β-hydroxyethyl) urea, or 1,1-bis-(γ-hydroxypropyl)-3-(β-hydroxyethyl) urea, respectively, in accordance with the method disclosed in Japanese Patent Publication No. 49-33933.

The acid carbon black characteristic of the present invention represents carbon black having acid groups on the surface thereof, and carbon black at pH of 5 or less and having a volatile content of 3.5 to 8% by weight is preferably used.

That is, when a recording solution of the present invention is prepared by using carbon black at pH of 5 or less and used for printing, the print density obtained is equivalent to or higher than that obtained by using dye ink.

Although it is not clear why using carbon black at pH of 5 or less causes an ink jet recording with a high density, it is postulated that increased affinity of the pigment particles for the ink solvent due to the presence of many surface acid groups in such carbon black, which affects pH, makes micro-dispersion possible, thereby increasing the print density.

The pH of carbon black in the present invention represents the value obtained by the following measurement method:

1 to 10 g of carbon black sample is weighed and placed in a beaker, and water is added to the beaker in a rate of 10 ml per 1 g sample. The beaker is covered with a watch glass, followed by boiling for 15 minutes (few droplets of ethanol may be added for facilitating wetting of the sample). After boiling, the beaker is cooled to room temperature, and the supernatant is removed by decantation or centrifugal separation to leave a mud substance. An electrode of a glass electrode pH meter is inserted into the mud substance, and pH is measured in accordance with JISZ8802(pH measurement method). In this case, since the measured value depends upon the insertion position of the electrode, pH is measured while changing the position of the electrode by moving the beaker with care to bring the electrode surface into sufficient contact with the mud surface, and the constant pH value is read.

In addition, the ink of the present invention is prepared by using carbon black having a volatile content within the range of 3.5 to 8% by weight, more preferably 4.5 to 6.0% by weight. When this ink is used for printing, a print density equivalent to or higher than that obtained by using dye ink can be obtained.

Although it is not clear why using carbon black having a volatile content of at least 3.5% by weight produces an ink jet recording having a high print density, it is postulated that the increased affinity of the pigment particles for the ink solvent due to the presence of many surface acid groups in such carbon black, which affects pH, makes microdispersion possible, thereby increasing the print density.

In an ink jet system in which ink droplets are discharged by applying thermal energy, when an ink formed by using carbon black having a volatile content of more than 8% by weight is discharged in an ink jet recording apparatus, the occurrence of poor printing is increased. It is thus particularly preferably to use carbon black having volatile content within the range of 3.5 to 8.0% by weight.

This is possibly because an excessively high volatile content causes deposit on a heater.

The volatile content of carbon black used in the present invention represents the value obtained by the following measurement method:

A dry sample of carbon black is packed to at least 2 mm below a cover in a platinum crucible or a porcelain crucible with a falling cover, both of which have the same shape and volume, and the mass of the dry sample is then measured. The covered crucible is placed in an electric oven, heated at 950°+25° C. for exactly 7 minutes, and then taken out. After allowing it to cool to room temperature in a desiccator, the mass after heating is measured, and the volatile content is calculated in accordance with the following equation:

$$V = \frac{W_D - W_R}{W_D} \times 100$$

wherein V=volatile content (%)

$W_D$=mass of dry sample (g)

$W_R$=mass of sample after heating (g)

Preferred examples of carbon black which can be used in the present invention include Mogul-L and Regal 400 R (produced by Cablack Co.,); Raven 3500, Raven 1255, Raven 1060, Raven 1040 and Raven 1035 (produced by Colombia Carbon Nihon); Color Black FW1, Color Black FW18, Color Black S170, Color Black S160, Printex U, Printex V, Printex 140U, Printex 140V, Special Black 350, Special Black 250 and special Black 100 (produced by Degusa Co.,); MA7, MA8, OIL 7B, OIL 11B, #2650, #2350 and #2200 (produced by Mitsubishi Kasei). Carbon black which is newly produced for achieving the object of the present invention may be used.

Carbon black is generally produced by a channel black method or a furnace black method. The channel black method is a method of partially burning natural gas, town gas or hydrocarbon as a raw material and then causing the burnt material to collide with a cold surface. The furnace black method is a method of spraying natural gas or a petroleum fraction in a closed reaction furnace kept in a high-temperature atmosphere to be thermally decomposed.

The thus-produced carbon black is oxidized with nitric acid or the like to obtain carbon black having desired acidity.

The ratio by weight of the carbon black is preferably within the range of 3 to 20% by weight, based on the total weight of the ink.

The water-soluble resin used for the carbon black in the present invention should have a weight average molecular weight within the range of 3,000 to 30,000, preferably 5,000 to 15,000.

In the ink jet recording apparatus, since the ink is discharged from a discharge opening of 50 μm or less, in a dispersion system such as a pigment ink, the discharge characteristics are greatly affected by the viscosity of the ink and the particle size of the dispersed material. It is thus preferred to decrease the viscosity and the particle size of the dispersed material as much as possible to have stable discharge.

When the same amount of high-molecular weight dispersing resin is dissolved in an aqueous solution, the viscosity increases with an increase in the average molecular weight. Since the dispersing resin adsorbs on the peripheries of carbon black particles dispersed therein and has the function to stably disperse the carbon black due to steric hindrance, an increase in the molecular weight of the dispersing resin means that the particle size of the dispersed material is increased due to an increase in thickness of the adsorbed layer.

Particularly, since acid carbon black has many acid groups near the surface thereof, the carbon black repulses the carboxyl groups added to the dispersing resin used in the present invention, thereby further increasing the particle size.

Namely, when acid carbon black is used as the ink of the present invention, discharge stability cannot be obtained unless the average molecular weight of the dispersing resin is decreased to decrease the viscosity of the ink and the particle size of the dispersed material. However, since the dispersing resin must adsorb on the peripheries of carbon black to provide steric hindrance, an excessively low average molecular weight deteriorates dispersion stability in long-term preservation.

Any resins which are soluble in aqueous solutions containing amine dissolved therein and have a weight average molecular weight of 3,000 to 30,000 can be used as the water soluble resin for dispersing carbon black in the ink of the present invention. Examples of such water-soluble resins include styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-maleic acid half ester copolymers, vinylnaphthalene-acrylic acid copolymers, vinylnaphthalene-maleic acid copolymers and salts thereof. Although the weight average molecular weight of the dispersing resin can be measured by various methods, it is generally measured by GPC (Gel Permeation Chromatography). The content of the water-soluble resin is preferably within the range of 0.1 to 5% by weight based on the total weight of the ink.

The above-described carbon black and water-soluble resin are dispersed or dissolved in an aqueous liquid medium.

A preferred aqueous liquid medium in the ink of the present invention is a solvent mixture containing water and a water-soluble organic solvent. It is preferably to use ion-exchanged water (deionized water), not general water containing various ions.

Examples of water-soluble organic solvents which can be used in mixture with water include organic amines such as monoethanolamine, diethanolamine, triethanolamine, aminomethylpropanol and the like; alkyl alcohols having 1 to 4 carbon atoms, such as methanol, ethanol, n-propyl alcohol, isopropyl alcohol, n-butyl alcohol, sec-butyl alcohol, tert-butyl alcohol, isobutyl alcohol and the like; amides such as dimethylformamide, dimethylacetamide and the like; ketone or ketoalcohols such as acetone, diacetone alcohol and the like; ethers such as tetrahydrofuran, dioxane and the like; polyalkylene glycols such as polyethylene glycol, polypropylene glycol, and the like; alkylene glycols having 2 to 6 carbon atoms in an alkylene group, such as ethylene glycol, propylene glycol, butylene glycol, triethylene glycol, 1,2,6-hexanetriol, thiodiglycol, hexylene glycol, diethylene glycol and the like; glycerin; lower alkyl ethers of polyhydric alcohols, such as ethylene glycol monomethyl (or ethyl) ether, diethylene glycol methyl (or ethyl) ether, triethylene glycol monomethyl (or ethyl) ether and the like; N-methyl-2-pyrrolidone; 1,3-dimethyl-2-imidazolidinone and the like.

Of these water-soluble organic solvents, organic amines are preferably used in the ink of the present invention in an amount of 0.001 to 10% by weight of the total amount of the ink.

Water-soluble organic solvents other than the organic amines are appropriately selected from the above solvents and contained in an appropriate amount in accordance with demand. However, polyhydric alcohols such as diethylene glycol and lower alkyl ether of polyhydric alcohols such as triethylene glycol monomethyl (or ethyl) ether are particularly preferred.

It was found that addition of at least 3% of ethanol or isopropyl alcohol is effective to obtain discharge stability. This is possibly because the addition of an ethanol or isopropyl alcohol solvent permits more stable foaming of the recording solution on a thin film resistor. However, since addition of excess ethanol or isopropyl alcohol causes the problem of deteriorating the print quality of printed matter, the appropriate concentration of the ethanol or isopropyl alcohol was found to be 3 to 10%. The addition of the ethanol or isopropyl alcohol solvent to the dispersion solution further has the effect of depressing foaming in dispersion and thus achieving effective dispersion.

The content of the water-soluble organic solvent in the ink of the present invention is generally within the range of 3 to 50% by weight based on the total weight of the ink, and the amount of the water used is 10 to 90 by weight of the total weight of the ink.

In order to obtain the ink having desired physical property values in accordance with demand, additives other than the above components, such as surfactants, antifoaming agents, antiseptics, etc., can be added to the ink of the present invention. A commercial water-soluble dye can also be added to the ink.

Examples of surfactants include anionic surfactants such as fatty acid salts, higher alcohol sulfates, liquid fatty oil sulfates, alkyl allylsulfonates, and the like; nonionic surfactants such as polyoxyethylene alkyl ethers, polyoxyethylene alkyl esters, polyoxyethylene sorbitan alkyl esters and the like. At least one surfactant can be appropriately selected from the above surfactants and used. Although the amount of the surfactant used depends upon the dispersant, the amount is preferably 0.01 to 5% by weight based on the total amount of the ink.

The amount of the surfactant added is preferably determined so that the surface tension of the ink is 30 dyne/cm or more. If the surface tension of the ink is smaller than 30 dyne/cm, undesirable phenomena such as printing deviation due to wetting of the nozzle tip may occur in the recording system of the present invention.

The performances generally required for an ink jet ink includes the above-described viscosity, surface tension and pH thereof. In a dispersion system such as an aqueous pigment ink, however, particularly in an ink jet system in which droplets are discharged by applying thermal energy, foaming of the ink sometimes becomes unstable even if the above physical properties are satisfied.

Thus, in order to thermally stabilize the aqueous pigment ink and permit optimum foaming of the ink, the ratio between carbon black and the water-soluble resin is within the range of 3:1 to 10:1 (ratio by weight), more preferably within the range of 10:3 to 10:1. Within this range, the ink is precisely foamed on a resistor under any driving conditions, and no deposit are produced on the thin-film resistor over a long period.

If excess water-soluble resin relative to carbon black is present in the ink, the ink is not foamed on the thin-film resistor even if predetermined thermal energy is applied, or the excess water-soluble resin is made insoluble by heat at pulse application and is deposited on the thin-film resistor, thereby causing non-discharge or distortion of printing.

When the amount of the water-soluble resin dissolved in the ink is 2% or less, preferably 1% or less, based on the total weight of the ink, best foaming is obtained, and this amount is thus preferable.

The water-soluble resin dissolved in the ink represents a resin which is dissolved in a liquid medium without adsorbing on the pigment in the ink.

It is also preferred that the total amount of carbon black and water-soluble resin in the dispersion is 10% or more. The reason for this is that an optimum dispersion state cannot be obtained by efficient dispersion unless the carbon black and water-soluble resin at a predetermined concentration or more are present in the dispersion.

The aforementioned ink of the present invention is formed by the method comprising mixing the carbon black in an aqueous solution of the dispersant which is made alkali by adding an amine or base, dispersing the carbon black by the means which will be described below to form a dispersion, adding the water-soluble solvent or water to the dispersion, and adjusting pH of the ink to 7 or more by using the pH adjustor. A water-soluble solvent, an antifoaming agent and so on may be added to the dispersion according to demand, or the dispersion itself may be used as an ink. Centrifugal separation may also be carried out if required.

In the ink forming method, it is necessary for decreasing the amount of unadsorbed resin to 2% or less to previously completely dissolve the resin by agitating the aqueous solution containing the resin, an amine or base and water at 60° C or more for 30 minutes or more.

It is also necessary to add, for dissolving the resin, the amine or base in an amount of 1.2 times the amount of amine or base determined by calculation from the acid value of the resin. The amount of the amine or base is determined according to the following equation:

$$\text{amount of amine or base (g)} = \frac{\text{acid value of resin} \times \text{molecular weight of amine or base} \times \text{amount of resin (g)}}{56000}$$

It is also preferred to pre-mix the aqueous solution containing the pigment for 30 minutes or more before dispersion.

The pre-mixing operation improves the wettability of pigment surfaces and promotes adsorption of the resin on the pigment surfaces.

Preferred examples of amines added to the dispersion include organic amines such as monoethanolamine, diethanolamine, triethanolamine, aminomethyl propanol, ammonia and the like.

Preferred examples of bases added to the dispersion include inorganic alkali agents such as hydrates of alkali metal salts, such as sodium hydroxide, potassium hydroxide, lithium hydroxide and the like.

On the other hand, any dispersing machines which are generally used can be used in the present invention, for example, a ball mill, a roll mill and a sand mill.

Of these machines, a high-speed sand mill is preferred, and Super Mill, Sand Grinder, Bead Mill, Agitator Mill, Grain Mill, Dynomill, Pearl Mill, and Cobol Mill (all trade names) are exemplified.

Methods of obtaining a pigment having a desired particle size distribution in the present invention include a method of decreasing the size of a grinding medium in a dispersing machine, a method of increasing the packing of a grinding medium, a method of increasing the treatment time, a method of decreasing the discharge speed, a method of classifying by a filter or a centrifugal separator after grinding, and combinations thereof are exemplified.

The amount of the unadsorbed resin in the present invention is preferably measured by a method comprising depositing the pigment and the resin adsorbed on the pigment by using an ultracentrifuge, and measuring the amount of the residual resin contained in the supernatant by TOC (Total Organic Carbon, total organic carbon meter) or a weight method (the supernatant is evaporated to dryness, and the amount of the resin is then measured).

Although the ink of the present invention is preferably used for the ink jet recording system in which droplets are discharged by the action of thermal energy to record an image, the ink can of course be used for general writing utensils.

A recording apparatus suitable for recording by using the ink of the present invention is an apparatus in which thermal energy is applied to the ink in a room of a recording head in correspondence with a recording signal to generate droplets. Since the ink of the present invention has excellent recovery properties, it is possible to decrease the force of the recovery operation section of the apparatus to a level lower than that of a conventional apparatus.

An embodiment of a recording apparatus used in the present invention is described in detail below.

Embodiment

FIGS. 1(A) and (B) show an ink jet recording head in accordance with an embodiment of the present invention, in which an ink tank comprising an ink containing member as an ink supply source and a recording head are combined to form a unit.

In these figures, reference numeral 100 denotes a recording head element comprising a discharge portion 102, a supply tank portion 104, a wiring substrate 105 on which wiring for transmitting a signal for driving a discharge energy generating element is provided, and a base plate 106 for supporting these components. The discharge portion 102 has discharge openings 102A formed in a surface opposite to a recording medium, liquid passages inwardly extended from the discharge openings, discharge energy generating elements such as electro-thermal converters respectively provided in the liquid passages, and a common liquid chamber communicating with the liquid passages. The supply tank portion 104 functions as a sub-tank for receiving the ink supplied from the side of the ink tank 110 and introducing the ink into the common liquid chamber in the discharge portion 102. The base plate 106 can be made of Al so as to function as a radiating plate for inhibiting heat generation of the head element accompanied by driving of the electro-thermal converters.

Reference numeral 112 denotes an ink absorber disposed in the ink tank 110, impregnated with ink, and is formed by using a porous substance or fibers. Reference numeral 114 denotes a cover member for the ink tank 110.

Reference numeral 107 denotes a projecting portion provided on the head element 100, and tapered in order to facilitate connection with the ink tank 110. Reference numeral 117 denotes an opening provided in the wall 117A of an element containing portion 110A of the ink tank 110 so as to engage the projecting portion 107 to combine the head element 100 and the ink tank 110. Reference numeral 118 denotes a butt member provided in the element containing portion 110A so as to facilitate the work of mounting the head element 100 and securing the mounting state, the butt member 118 engaging the rear end of the base plate 106. Reference numeral 119 denotes a projection for positioning the head element 100, and reference numeral 120 denotes a supply port for supplying the ink into the head element from the ink tank 110. Details of the construction will be described below.

An ink jet printer, i.e., an ink jet printer using a cartridge type recording head, as shown in FIG. 2, can be formed by using the ink jet recording head having the above construction.

In FIG. 2, reference numeral 14 denotes the cartridge type recording head shown in Figs. 1(A) and (B). The recording head 14 is fixed on a carriage 15 by a pressure member 41, and can reciprocate together with the carriage 15 in the longitudinal direction along shafts 21. The recording head 14 can be positioned with respect to the carriage 15 by, for example, a hole provided in the recording head element 100 and a dowel provided on the side of the carriage 15.

The ink discharged from the recording head reaches a recording medium 18 at a small distance from the recording head and regulated in the recording surface by a platen 19 to form an image on the recording medium 18.

To the recording head is supplied a discharge signal corresponding to image data from an appropriate data supply source through a cable 16 and a terminal connected thereto. One or a plurality (in the drawing, 2) of cartridges 14 can be provided in accordance with the color of the ink used.

In FIG. 2, reference numeral 17 denotes a carriage motor for scanning the carriage 15 along the shafts 21, and reference numeral 22 denotes a wire for transmitting the driving force of the motor 17 to the carriage 15. Reference numeral 20 denotes a feed motor connected to the platen roller 19 so as to convey the recording medium 18.

Figure 3A:
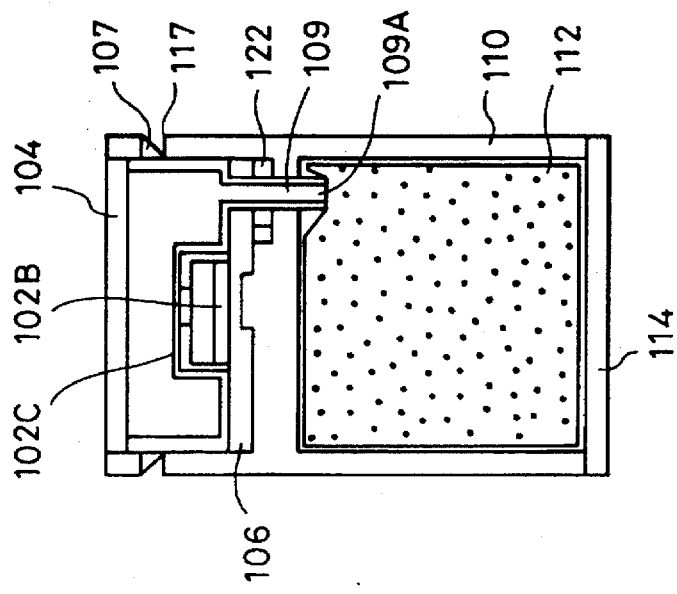
FIGS. 3(A) and 3(B) are sectional views illustrating a state where the recording head element shown in FIGS. 1 (A) and 1 (B) is connected to an ink tank.

FIG. 3(A) and (B) show sections taken along line A—A in FIGS. 1(A) and (B), respectively. The state where the head element 100 is mounted on the ink tank 101 is described with reference to FIGS. 3(A) and (B).

In FIGS. 3(A) and (B), reference numeral 109 denotes a communicating tube passed through the base plate 106 and projected from the supply tank portion 104 of the head element 100 through the base plate 106. The communicating tube 109 can enter the ink tank 110 through the supply port 120 thereof. Reference numeral 109A denotes a filter provided at the tip of the communicating tube 109 so as to prevent the entrance of bubbles and so on into the supply tank 104A from the side of the ink tank 110. Reference numerals 102B and 102C respectively denote a heater board provided with an electro-thermal converter (heater) as a discharge energy generating element, and a top board combined with the heater board to form the discharge portion 102. The top board 102C forms the discharge openings 102A, the liquid passages communicating therewith, and the common liquid chamber receiving the ink from the supply tank 104A and supplying the ink to each of the liquid passages.

In connection between the head element 100 and the ink tank 110, the head element 100 is mounted on the ink tank 110 in the direction of the arrow shown in FIG. 3(A). At this time, the wall 117A of the ink tank 110 is outwardly pushed with engagement with the tapered surface of the projection 107, and the communicating tube 109 enters the supply port 120.

Figure 3B:
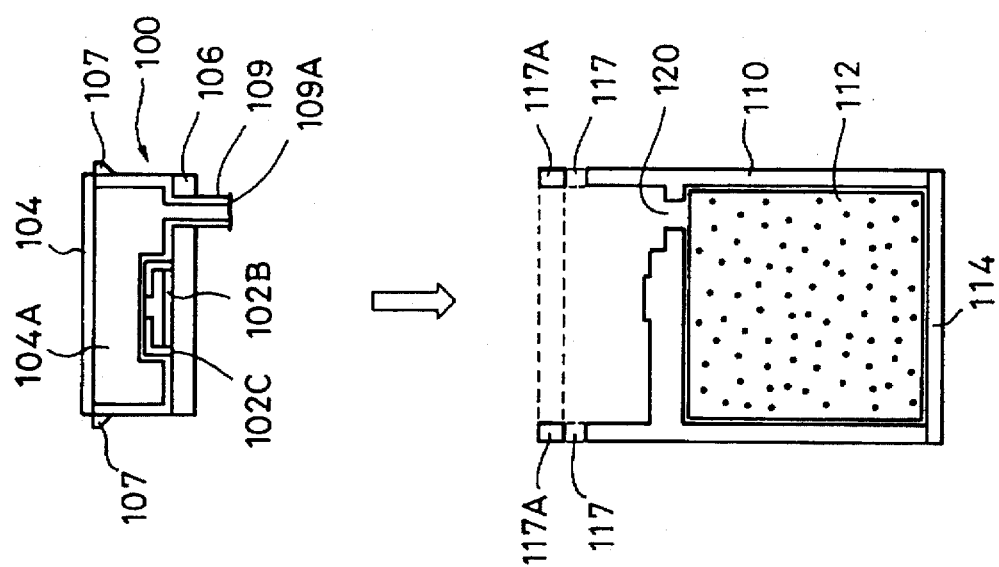

However, when the projection 107 reaches a position completely opposite to the opening 117, the wall 117A returns to the original position due to the springness thereof, and the projection 107 enters the opening 117 to obtain the mounting state shown in FIG. 3(B). On the other hand, the communicating tube 109 assumes the state where the inlet port at the tip thereof is in pressure contact with the absorber 112, thereby obtaining good communication with the ink. In FIG. 3(B), reference numeral 122 denotes an O-ring as a sealer for securely sealing the ink in the supply portion 120.

The above-described construction permits connection between the head element 100 and the ink tank 110 only by pushing the head element 100 toward the ink tank 110 in the direction of the arrow shown in FIG. 3(A) without the need for the bonding step. Further, since the communicating tube 109.provided on the side of the head element 100 enters the ink tank 110 so that the tip thereof is in pressure contact with the ink absorber 112, the communication with the ink can be secured.

In the above construction, the projection 107 is provided on the head element side, and the opening 117 is provided in the wall 117A of the ink tank 110 so that, in mounting, engagement between the projection 107 and the opening 117 is attained by employing deflection and elasticity of the wall 117A. However, the construction of this portion can be changed to any desired form. For example, even if the wall 117A is relatively rigid, not provided with flexibility, the projection 107 may be supported by a spring or the like so as to be urged to outwardly project. In this case, the projection 107 is inwardly retracted with the mounting operation, and engages the opening 117 by urging force of the spring when opposed to the opening 117.

The present invention is described in detail below with reference to examples.

EXAMPLE 1

(Formation of Pigment Dispersion)

Styrene-acrylic acid-butyl acrylate copolymer (acid value 60, weight average molecular weight 13,000)

|  | 3 parts |
| --- | --- |
| 1,3-bis-(β-hydroxyethyl) urea | 0.5 part |
| Ion-exchanged water | 72.5 parts |
| Diethylene glycol | 5 parts |

The above components were mixed and then heated to 70° C in a water bath to completely dissolve the resin content. 14 parts of carbon black (Color Black S170 produced by Degsa) and 5 parts of isopropyl alcohol were added to the resultant solution, and then pre-mixed for 30 minutes, followed by dispersion treatment under the following conditions:

Dispersing machine: Sand Grinder (produced by Igarashi Kikai)
Grinding medium: zirconium bead, 1 mm size
Packing of grinding medium: 50% (volume)
Grinding time: 3 hr.

Coarse particles were then removed by centrifugal separation (12,000 rpm, 20 minutes) to form a dispersion.

| (Formation of Ink) | |
| --- | --- |
| The above dispersion | 30 parts |
| Diethylene glycol | 20 parts |
| Isopropyl alcohol | 5 parts |
| 1,3-bis(β-hydroxyethyl) urea | 3 parts |
| Ion-exchanged water | 42 parts |

The ratio by weight between the pigment and the resin in the ink was 14:3.

EXAMPLE 2

(Formation of Pigment Dispersion) Styrene-maleic half ester-maleic anhydride copolymer (acid value 188, weight average molecular weight 15,000)

|  | 6 parts |
| --- | --- |
| 1-mono-γ-hydroxypropyl, 3-mono-(β-hydroxyethyl) urea | 3.5 parts |
| urea | |
| Ion-exchanged water | 58.5 parts |
| Diethylene glycol | 5 parts |

The above components were mixed and then heated to 70° C in a water bath to completely dissolve the resin content. 20 parts of carbon black (MA8, produced by Mitsubishi Kasei) and 7 parts of ethanol were added to the resultant solution, and then pre-mixed for 30 minutes, followed by dispersion treatment under the following conditions:

Dispersing machine: Pearl Mill (produced by Ashizawa)
Grinding medium: glass bead, 1 mm size
Packing of grinding medium: 50% (volume)
Discharge speed: 100 ml/min Coarse particles were then removed by centrifugal separation (12,000 rpm, 20 minutes) to form a dispersion.

| (Formation of Ink) | |
| --- | --- |
| The above dispersion | 30 parts |
| Diethylene glycol | 15 parts |
| Ethylene glycol | 5 parts |
| Ethanol | 5 parts |
| 1-mono-γ-hydroxypropyl, 3-mono (β-hydroxyethyl) urea | 3 parts |
| Ion-exchanged water | 42 parts |

The ratio by weight between the pigment and the resin in the ink was 10:3.

EXAMPLE 3

(Formation of Pigment Dispersion) Styrene-acrylic acid-butyl acrylate copolymer (acid value 80, weight average molecular weight 6700)

| | |
|---|---|
| 1,3-bis-(β-hydroxyethyl) urea | 5 parts |
| | 0.7 parts |
| Ion-exchanged water | 62.3 parts |
| Diethylene glycol | 5 parts |

The above components were mixed and then heated to 70° C in a water bath to completely dissolve the resin content. 20 parts of carbon black (COLOR BLACK FW1, produced by Degusa) and 7 parts of ethanol were added to the resultant solution, and then pre-mixed for 30 minutes, followed by dispersion treatment under the following conditions:

Dispersing machine: Pearl Mill (produced by Ashizawa)
Grinding medium: glass bead, 1 mm size
Packing of grinding medium: 50% (volume)
Discharge speed: 100 ml/min Coarse particles were then removed by centrifugal separation (12,000 rpm, 20 minutes) to form a dispersion.

| (Formation of Ink) | |
|---|---|
| The above dispersion | 50 parts |
| Glycerin | 15 parts |
| Ethylene glycol | 5 parts |
| Ethanol | 5 parts |
| 1,3-bis-(β-hydroxyethyl) urea | 10 parts |
| Ion-exchanged water | 15 parts |

The ratio by weight between the pigment and the resin in the ink was 4:1.

EXAMPLE 4

| (Formation of Pigment Dispersion) | |
|---|---|
| Styrene-maleic half ester-maleic anhydride copolymer (acid value 188, weight average molecular weight 15,000 | 5 parts |
| 1-mono-β-hydroxyethyl-3,3-bis-(β-hydroxyethyl) urea | 3.5 parts |
| Ion-exchanged water | 66.5 parts |
| Ethylene glycol | 5 parts |

The above components were mixed and then heated to 70° C in a water bath to completely dissolve the resin content. 15 parts of carbon black (MOGUL L, produced by Cabot) and 5 parts of ethanol were added to the resultant solution, and then pre-mixed for 30 minutes, followed by dispersion treatment under the following conditions:

| Dispersing machine: | Sand Grinder (produced by Igarashi) |
|---|---|
| Grinding medium: | zirconium bead, 1 mm size |
| Packing of grinding medium: | 50% (volume) |
| Grinding time: | 3 hr. |

Coarse particles were then removed by centrifugal separation (12000 rpm, 20 minutes) to form a dispersion.

| (Formation of Ink) | |
|---|---|
| The above dispersion | 35 parts |
| Thiodiglycol | 15 parts |
| Ethylene glycol | 5 parts |

| (Formation of Ink) | |
|---|---|
| Ethanol | 4 parts |
| 1-mono-β-hydroxyethyl-3,3-bis-(β-hydroxyethyl) urea | 3 parts |
| Ion-exchanged water | 38 parts |

The ratio by weight between the pigment and the resin in the ink was 3:1.

EXAMPLE 5

The carbon black contained in the dispersion of Example 1 was changed to carbon black (#2650, produced by Mitsubishi Kasei).

The ratio by weight between the pigment and the resin in the ink was 14:3.

| (Formation of Ink) | |
|---|---|
| The above dispersion | 30 parts |
| Glycerin | 10 parts |
| Thiodiglycol | 10 parts |
| Isopropyl alcohol | 5 parts |
| 1,3-bis-(β-hydroxyethyl) urea | 1 part |
| Ion-exchanged water | 44 parts |

Comparative Example 1

The dispersion of Example 1 except that 0.2 part of urea was used in place of 1,3-bis-(β-hydroxyethyl) urea and 72.8 parts of ion-exchanged water was used

| | |
|---|---|
| Diethylene glycol | 30 parts |
| Isopropyl alcohol | 20 parts |
| Urea | 5 parts |
| Ion-exchanged water | 5 parts |
| | 40 parts |

The ratio by weight between the pigment and the resin in the ink was 14:3.

Comparative Example 2

An ink was formed by the same method as that employed in Example 1 except that the carbon black contained in the dispersion of Example 1 was changed to RAVEN1040 (produced by Colombia).

The ratio by weight between the pigment and the resin in the ink was 14:3.

Comparative Example 3

An ink was formed by the same method as that employed in Example 1 except that the carbon black contained in the dispersion of Example 1 was changed to #2400B (produced by Mitsubishi Kasei).

The ratio by weight between the pigment and the resin in the ink was 14:3.

Comparative Example 4

An ink was formed by the same method as that employed in Example 1 except that the amounts of dispersing resin, 1,3-bis-(β-hydroxyethyl) urea and ion-exchanged water contained in the dispersion of Example 1 were changed to 14 parts, 2.3 parts and 59.7 parts, respectively.

The ratio by weight between the pigment and the resin in the ink was 1:1.

Comparative Example 5

An ink was formed by the same method as that employed in Example 1 except that the amounts of dispersed resin, 1,3-bis-(β-hydroxyethyl) urea and ion-exchanged water contained in the dispersion of Example 1 were changed to 1 part, 0.2 part and 74.8 parts, respectively.

The ratio by weight between the pigment and the resin in the ink was 15:1.

The performances of the carbon black used in Examples and Comparative Examples are shown in Table 1.

TABLE 1

| Name of Carbon Black | Particle Size (nm) | Specific Surface Area (m²/g) | DBP Oil Absorption (ml/100 g) | Volatile (wt %) | pH |
|---|---|---|---|---|---|
| COLOR BLACK | | | | | |
| S170 | 17 | 200 | 150 | 4.5 | 4.0 |
| MA8 | 24 | 137 | 58 | 3.5 | 3.0 |
| COLOR BLACK | | | | | |
| FW1 | 13 | 320 | 170 | 6.0 | 4.0 |
| MOGUL | | | | | |
| L | 24 | 138 | 60 | 5.0 | 3.4 |
| #2650 | 13 | 320 | 80 | 8.0 | 3.0 |
| RAVEN | | | | | |
| 1040 | 26 | 120 | 60 | 3.0 | 5.5 |
| #2400B | 15 | 260 | 45 | 10.0 | 2.0 |

The results of evaluation of Examples 1 to 5 and Comparative Examples 1 to 5 are shown in Table 2.

(Evaluation Method)

(Preservation stability) 100 ml of ink was placed in a 100-ml glass bottle produced by Shot Corp., and allowed to stand in a constant-temperature bath at 60° C for 3 months. After allowing to stand, the bottle was stood bottom up to examine the presence of deposit (sediment) at the bottom of the bottle.

◎: no sediment o: Presence of slight sediment x: Presence of sediment (Recovery property) The ink tank of each of the ink jet ink printer which will be described below was filled with an ink. After initial printing, a cartridge in which the ink tank and a recording head are integrated, or only the ink tank of the separate type was separated from the body of a recording apparatus. After allowing to stand at room temperature (25° C) for 3 days, the cartridge or the ink tank was again mounted on the recording apparatus, and the print state was examine after recovery scanning.

◎: Normal printing was possible without recovery operation o: Normal printing was possible after three times or less of recovery operations x: Normal printing was possible after at least four times of recovery operations, or normal printing was impossible regardless of the number of times of recovery operations (Discharge stability) The ink tank of each of the ink jet printers which will be described below was filled with an ink. After initial printing, the integral cartridge was removed from the body of the recording apparatus, and a tape was applied to the recording solution discharge portion and fixed by capping. After allowing to stand at 60° C. for 3 months, the cartridge was mounted again on a printer, and discharge properties were examined by printing until the ink was used up after the recovery operation.

TABLE 2

Evaluation Results

| | Preservation Stability | pH Immediately after | pH 3 months after | Odor | Recovery Properties BJ10V | Recovery Properties T.P | Recovery Properties D.W | Discharge Stability BJ10V | Discharge Stability T.P | Discharge Stability D.W | Print Density (OD) BJ10V | Print Density (OD) T.P | Print Density (OD) D.W | Amount of Residual Resin (%) |
|---|---|---|---|---|---|---|---|---|---|---|---|---|---|---|
| Example 1 | o | 9.5 | 9.2 | None | ◎ | ◎ | ◎ | o | o | o | 1.5 | 1.5 | 1.4 | 0.21 |
| Example 2 | o | 9.3 | 9.1 | " | ◎ | ◎ | ◎ | o | o | o | 1.5 | 1.5 | 1.4 | 0.15 |
| Example 3 | o | 9.9 | 9.8 | " | ◎ | ◎ | ◎ | o | o | o | 1.7 | 1.7 | 1.6 | 0.17 |
| Example 4 | o | 9.3 | 9.0 | " | ◎ | ◎ | ◎ | o | o | o | 1.5 | 1.5 | 1.4 | 0.18 |
| Example 5 | o | 8.8 | 8.6 | " | o | o | o | o | o | o | 1.5 | 1.5 | 1.4 | 0.25 |
| Comparative Example 1 | x | 7.1 | 9.5 | Odor of ammonia | x | x | x | x | x | x | 1.5 | 1.5 | 1.4 | 0.21 |
| Comparative Example 2 | o | 9.5 | 9.4 | None | ◎ | o | ◎ | o | o | o | 1.2 | 1.2 | 1.1 | 0.25 |
| Comparative Example 3 | x | 9.1 | 8.9 | " | x | x | x | x | x | x | Ink was discharged, but measurement was impossible. | | | 0.26 |
| Comparative Example 4 | ◎ | 9.7 | 9.6 | " | No discharge of ink in all printers. | | | Did no evaluate | | | Did not evaluate | | | 2.3 |
| Comparative Example 5 | x | 9.2 | 8.5 | " | x | x | x | x | x | x | Ink was discharged, but measurement was impossible. | | | 0.31 |

In a separate type, only the ink tank was separated, and a tape was fused by heating to the connection portion with the recording head. Like the integral type, after allowing to stand, the ink tank was again mounted on the printer, and the evaluated.

o: The ink was discharged from the entire discharge portion, printing was possible until the ink was used up, and the printing quality was the same as that before preservation.

x: The ink was not discharged from a part of the discharge portion, or the ink was discharge from all discharge openings, but printing quality significantly deteriorated as compared with that before preservation.

(Optical density of print)

The optical density of the print obtained by each ink jet printer was measured by using a Macbeth densitometer (RD918).

(pH) pH of the ink was measured immediately after the ink was formed and after preservation at 60° C. for 3 months, and variation was examined. pH meter HORIA M-12 was used.

(Odor) The odor of the ink was confirmed.

(Amount of residual resin) The ink was centrifuged by a very-high-speed cooling centrifuge (produced by Beckman) at 55,000 rpm for 5 hr to deposit the pigment and the resin adsorbed on the resin. A predetermined amount of supernatant was then collected, and dried to form solid by a vacuum drier (60° C., 24 hr). The percentage of the thus-obtained resin to the charged ink was calculated to determine the concentration of the residual resin.

Sanyo Kokusaku Pulp NP-SK paper was used as a recording material.

The ink jet printers used in evaluation were the following three printers:

1. Trade name BJ10V, produced by Canon (head and ink tank are integrated)

2. Trade name Think Pat (T.P.), produced by IBM (head and ink tank are integrated)

3. Trade name Desk Writer (D.W.), produced by HP (head and ink tank are separated)

An ink jet recording head which facilitates connection between the head body (head element) and the ink tank, and which can obtain reliable ink communication state could be realized.

While the present invention has been described with respect to what is presently considered to be the preferred embodiment, it is to be understood that the invention is not limited to the disclosed embodiments. To the contrary, the invention is intended to cover various modifications and equivalent formulations included within the sprint and scope of the appended claims. The scope of the following claims is to be accorded the broadest interpretation so as to encompass all such modifications and equivalent formulations and functions.

What is claimed is:

1. An ink comprising (1) acid carbon black having a volatile content within the range of 3.5 to 8% by weight and (2) a water-soluble resin having a weight average molecular weight within the range of 3,000 to 30,000, wherein (1) and (2) are dissolved in an aqueous liquid medium, and (3) a compound represented by the following formula (I), wherein the ratio by weight between the contents of said acid carbon black and said water-soluble resin is within the range of 3:1 to 10:1;

$$R_1R_2NCONHCH_2CH_2OH \quad (I)$$

wherein $R_1$ and $R_2$ each is hydrogen or $C_nH_{2n}OH$, n is 2 or 3, with the proviso that $R_1$ and $R_2$ are not simultaneously hydrogen.

2. An ink according to claim 1, wherein said acid carbon black has pH of 5 or less.

3. An ink according to claim 1, wherein said water-soluble resin has a weight-average molecular weight within the range of 5,000 to 15,000.

4. An ink according to claim 1, wherein the ratio by weight between the contents of said acid carbon black and said water-soluble resin is within the range of 10:3 to 10:1.

5. An ink according to claim 1, wherein said carbon black has a volatile content within the range of 4.5 to 6.0% by weight.

6. An ink according to claim 1, wherein the amount of the water-soluble resin dissolved in said liquid medium is 2% or less by weight based on the total weight of the ink.

7. An ink according to claim 1, wherein the amount of the water-soluble resin dissolved in said liquid medium is 1% or less by weight based on the total weight of the ink.

8. An ink according to claim 1, wherein a compound represented by said formula (I) is 1,3-bis-(βhydroxyethyl) urea.

9. An ink according to claim 1, wherein said aqueous liquid medium contains water and an organic solvent.

10. An ink according to claim 1, wherein said aqueous liquid medium contains at least one organic solvent selected from methanol, ethanol, n-propyl alcohol, isopropyl alcohol, n-butyl alcohol, sec-butyl alcohol, tert-butyl alcohol, and isobutyl alcohol.

11. An ink jet recording unit comprising an ink containing portion containing an ink and a head portion for discharging said ink as ink droplets, wherein said ink is an ink of any one of claims 1 to 10.

12. An ink jet recording unit according to claim 11, wherein said head portion includes a head for discharging ink droplets by applying thermal energy to an ink.

13. An ink cartridge comprising an ink containing portion for containing an ink, wherein said ink is an ink of any one of claims 1 to 10.

14. An ink jet recording apparatus comprising a recording unit having an ink containing portion containing an ink and a head portion for discharging said ink as ink droplets, wherein said ink is an ink of any one of claims 1 to 10.

15. An ink jet recording apparatus according to claim 14, wherein said head portion includes a head for discharging ink droplets by applying thermal energy to said ink.

16. An ink jet recording apparatus comprising an ink cartridge provided with an ink containing portion containing an ink and a recording head for discharging said ink as ink droplets, wherein said ink is an ink of any one of claims 1 to 10.

17. An ink jet recording apparatus according to claim 16, further comprising an ink supply portion for supplying said ink contained in said ink cartridge to said recording head.

18. An ink jet recording apparatus according to claim 16, wherein said recording head includes a head for discharging ink droplets by applying thermal energy to said ink.

19. An ink jet recording apparatus according to claim 17, wherein said recording head includes a head for discharging ink droplets by applying thermal energy.

20. An ink jet recording method for recording comprising discharging an ink as ink droplets, wherein said ink is an ink of any one of claims 1 to 10.

21. An ink jet recording method according to claim 19, further comprising applying thermal energy for discharging ink droplets.

* * * * *

UNITED STATES PATENT AND TRADEMARK OFFICE
CERTIFICATE OF CORRECTION

PATENT NO. : 5,686,508
DATED : November 11, 1997
INVENTOR(S) : MASAKO SHIMOMURA, ET AL.

It is certified that error appears in the above-identified patent and that said Letters Patent is hereby corrected as shown below:

COLUMN 4:

Line 36, "(1-γγ-hydroxypropyl-" should read --(1-γ-hydroxypropyl- --.

COLUMN 6:

Line 65, "preferably" should read --preferable--.

COLUMN 7:

Line 47, "90" should read --90%--.

COLUMN 8:

Line 17, "are" should read --is--.

COLUMN 10:

Line 1, "A1" should read --Al--.

UNITED STATES PATENT AND TRADEMARK OFFICE
CERTIFICATE OF CORRECTION

PATENT NO. : 5,686,508

DATED : November 11, 1997

INVENTOR(S) : MASAKO SHIMOMURA, ET AL.

It is certified that error appears in the above-identified patent and that said Letters Patent is hereby corrected as shown below:

COLUMN 11:

Line 18, "On" should read --On--.

Lines 52 and 53, "Styrene-acrylic acid-butyl acrylate copolymer (acid value 60, weight average molecular weight 13,000)" should be deleted.

Line 56, before "3 parts" insert --Styrene-acrylic acid-butyl acrylate copolymer (acid value 60, weight average molecular weight 13,000)--.

COLUMN 12:

Lines 24, 25 and 26, "Styrene-maleic half ester-maleic anhydride copolymer (acid value 188, weight average molecular weight 15,000)" should be deleted.

Line 29, before "6 parts" insert --Styrene-maleic half ester-maleic anhydride copolymer (acid value 188, weight average molecular weight 15,000)--.

UNITED STATES PATENT AND TRADEMARK OFFICE
CERTIFICATE OF CORRECTION

PATENT NO. : 5,686,508
DATED : November 11, 1997
INVENTOR(S) : MASAKO SHIMOMURA, ET AL.

It is certified that error appears in the above-identified patent and that said Letters Patent is hereby corrected as shown below:

Lines 65, 66 and 67, "Styrene-acrylic acid-butyl acrylate copolymer (acid value 80, weight average molecular weight 6700)" should be deleted.

COLUMN 13:

Line 2, before "5 parts" insert --Styrene-acrylic acid-butyl acrylate copolymer (acid value 80, weight average molecular weight 6700)--.

COLUMN 14:

Lines 30, 31 and 32, "The dispersion of Example 1 except that 0.2 part of urea was used in place of 1,3-bis-(β-hydroxyethyl) urea and 72.8 parts of ion-exchanged water was used" should be deleted.

Line 35, before "30 parts" insert --The dispersion of Example 1 except that 0.2 part of urea was used in place of 1,3-bis-(β-hydroxyethyl) urea and 72.8 parts of ion-exchanged water was used--.

UNITED STATES PATENT AND TRADEMARK OFFICE
CERTIFICATE OF CORRECTION

PATENT NO. : 5,686,508  Page 4 of 4
DATED :
INVENTOR(S) : November 11, 1997

MASAKO SHIMOMURA, ET AL.

It is certified that error appears in the above-identified patent and that said Letters Patent is hereby corrected as shown below:

COLUMN 16:

Line 19, "examine" should read --examined--.

COLUMN 17:

Line 49, "sprint" should read --spirit--.
Line 62, "10:1;" should read --10:1:--.

COLUMN 18:

Line 22, "1,3-bis-(βhydroxyethyl)" should read --1,3-bis-(β-hydroxyethyl)--.

Signed and Sealed this

Twenty-eighth Day of July, 1998

Attest:

BRUCE LEHMAN

Attesting Officer   Commissioner of Patents and Trademarks